Figure 1:
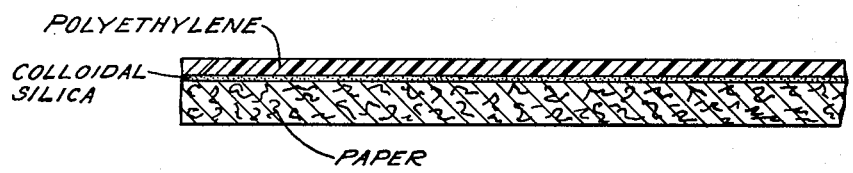

INVENTOR.
DAVID R. DERETCHIN
GORDON F. SANTEE
BY Robert P. Auber
George W. Reiber
ATTORNEYS

United States Patent Office 3,142,609
Patented July 28, 1964

3,142,609
METHOD OF IMPROVING THE ADHESION OF POLYETHYLENE TO PAPER AND THE ARTICLE PRODUCED THEREBY
David R. Deretchin, Liberty, N.Y., and Gordon F. Santee, Easton, Pa., assignors to American Can Company, New York, N.Y., a corporation of New Jersey
Filed Aug. 30, 1960, Ser. No. 52,861
6 Claims. (Cl. 161—39)

The present invention pertains to a method of adhering polyethylene to paper and the article produced by this method. More particularly, it pertains to a method of improving the adhesion of polyethylene film to a paper surface by providing an adhesion promoter between the paper and resin members of the lamina and the article resulting from this method.

Because of its very high degree of inertness, its favorable barrier properties, and relatively low cost, polyethylene has achieved wide usage in the packaging and container manufacturing industry, especially in the form of a paper-polyethylene lamina. The most usual form of laminating the polyethylene to paper is to extrude the resin in the form of a thin film and, while the resin is still hot from the extrusion operation, to press it onto a moving web of paper. Hot polyethylene has inherently a certain degree of adherence to paper; however, this adherence, while it has been satisfactory in some applications, is susceptible to considerable improvement.

Since the adhesion of polyethylene, as with most plastics, increases as its temperature is increased, an obvious expedient of improving the adhesion of polyethylene to paper is to laminate it to the paper at higher temperatures. However, this expedient suffers from the disadvantage that the higher the temperature to which the polyethylene is heated, the more readily it oxidizes, thereby lessening its desirable properties of inertness and gloss. Further, such oxidized polyethylene has an off-odor which markedly reduces its suitability as a packaging material, especially for foodstuffs. Therefore, it is advantageous to maintain the temperature of polyethylene below that at which appreciable oxidation will occur during the laminating operation and still obtain optimum adhesion to the paper web.

In many finished articles made from a paper-polyethylene lamina, seams and joints are present. The most usual means of forming these seams or joints is by the well-known practice of overlapping the surfaces to be bonded and heat sealing the polyethylene to the contiguous paper. In general, this heat sealing operation involves pressing together of the surfaces to be joined with the polyethylene between the surfaces in a heated, tacky, and adhesive condition. Obviously, for any automatic or semi-automatic commercial operation, as short a time as possible to effect these heat seals is desirable.

It is therefore a prime object of the present invention to improve the adhesion of polyethylene film to a paper web in the formation of flat, laminated sheet or strip stock.

An equally prime object is to reduce the heat sealing time of polyethylene film to paper in the formation of a lap joint with a paper-polyethylene lamina.

Another object is to provide uniform and improved bonds of polyethylene to paper regardless of variations in the paper surface tending to cause non-uniform bonding of the polyethylene to the paper.

A further object is to provide a method of the character described which is easily and inexpensively accomplished.

Still a further object is to provide a bond of polyethylene and paper wherein for a given time-temperature-pressure relationship, the adherence between the polyethylene and paper is markedly improved.

Numerous other objects and advantages of the invention will be apparent as it is better understood from the following description, which, taken in connection with the accompanying drawings, discloses a preferred embodiment thereof.

Figure 2:
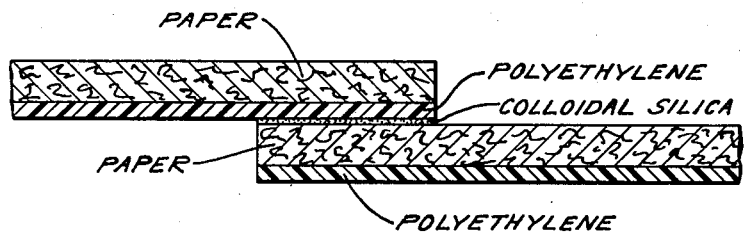

Referring to the drawing:

FIGURE 1 is an enlarged sectional view showing a flat lamina of paper and polyethylene; and FIG. 2 is an enlarged sectional view of a lap joint of paper-polyethylene laminas.

The above objects are accomplished by applying to the surface of the paper to which polyethylene is to be laminated or adhered a layer of an aqueous, colloidal solution of silica, which is also known as silica sol, drying the layer to evaporate the liquid from the sol, and thereafter bonding a heated or hot polyethylene film to the surface having the dry coating thereon. Where it is desired to produce a paper-polyethylene lamina in strip or sheet form, the silica sol is applied to one surface of the paper web, dried, and a hot polyethylene film applied thereover. If it is desired to produce a lap joint, a paper-polyethylene lamina is used either with or without a layer of dried silica sol between the paper and polyethylene plies. It is necessary only that a layer of dried silica sol be present between the paper surface of one member of the lap joint and the contiguous polyethylene surface of the other member of the joint.

As used herein, the term paper web is meant to include paper either in the form of continuous strip or individual sheets; i.e., flat stock having a large surface area relative to its cross-sectional area.

Any of the papers and polyethylenes known and used in the art for the production of paper-polyethylene lamina in strip or sheet form may be used in the instant invention. In the packaging industry the paper layer of the lamina is usually calendered stock of about 3 to 50 mils thick and the polyethylene layer is about 0.2 to 10 mils thick.

As known in the art, the polyethylene most usually is in the form of a hot, thin film at the time of its lamination to the paper web. To form this heated film, the polyethylene may be calendered and applied to the paper by a series of rollers, as shown in U.S. Patent 2,462,331. Another means of supplying a hot film of polyethylene to a moving web of paper is by extruding the polyethylene onto the paper web, such as shown in U.S. Patent 2,607,712. The latter method involving the extrusion of a film of hot polyethylene is preferred in the instant invention.

As mentioned previously, polyethylene tends to oxidize when subjected to the atmosphere at relatively high temperature. In general, the prior art extrudes the polyethylene within a temperature range of approximately 590 to 630° F., and usually about 600° F. to obtain good adhesion thereof to paper. However, by means of the instant invention, excellent adhesion of polyethylene to paper is achieved when the laminating operation is carried out at temperatures of 570° F. and even somewhat lower. Of course, if oxidation of the polyethylene is not a factor to be considered, higher temperatures during the lamination can be used.

The improvement of adhesion of the polyethylene to the paper constituting the basis of the present invention is produced by coating the surface of the paper to which the polyethylene will be adhered with a layer of silica sol. Silica sols are old and well known in the art and consist essentially of an aqueous colloidal solution of amorphous silica ($SiO_2$) particles and an alkali oxide, usually sodium oxide ($Na_2O$). These sols may be prepared in any suitable manner; for example, one of the methods disclosed in column 7 of U.S. Patent 2,574,902. However, best results as to adhesion improvement and reduction in heat sealing times are obtained with the silica sols disclosed and claimed in U.S. Patents 2,574,902 and 2,577,485. Therefore, the disclosure of these patents is incorporated herein by reference. Silica sols of this type are sold commercially; and may be purchased under any one of a number of trade names such as Ludox L S and Ludox S M. For practical operation in the present invention, a silica sol having a concentration of silica of from 15% to 40% and preferably about 30% by weight is used. The aqueous liquid vehicle of the sol may be either all water or a mixture of water and a volatile liquid miscible with the water such as a lower alkanol, i.e., methanol, ethanol, n- and isopropanol, or butanol.

After a silica sol of desired properties is applied to the surface of the paper, the aqueous liquid is evaporated either at room temperature or by heating the coating. Drying at room temperature, although operable, requires about 30 seconds, which makes such a process commercially unsatisfactory. Therefore, it is preferred to heat the coating to a sufficiently high temperature to accomplish the drying in time interval of 2 seconds to 15 seconds. Obviously, the temperature must be below that which will cause scorching of the paper. A water-alcohol liquid system evaporates more readily than an all-water system under the same conditions. However, the former system necessitates additional apparatus for the recovery of the relatively expensive alcohol.

Sufficient silica sol is applied to the paper surface so that upon drying, a layer of dried silica is present in an amount of 1 to 12 mgs. per 4 in.$^2$ of paper surface and preferably about 3 to 5 mgs. per 4 in.$^2$ of paper surface. Amounts of dried silica coating less than the minimum specified fail to give any appreciable increase in adhesion. As the amount of the dried silica layer is increased above this minimum, both the adhesion and heat sealability of the polyethylene to the coated paper increases up to a maximum. As the amount of dried silica is increased above this amount, adhesion and heat sealability decrease, so that above the 12 mgs. per 4 in.$^2$ maximum disclosed, adhesion and heat sealability are no better than with no silica present.

In the production of a paper-polyethylene lamina utilizing the instant invention, the silica sol is applied over the entire surface of the paper web to which the polyethylene is to be laminated as illustrated in FIG. 1. If the invention is to be used to improve the heat sealability of lap joints, the silica sol may be applied over the entire surface of the paper, including areas of paper which will enter into the heat sealed lap joint and also those that will not; or the paper surface may be coated only in those predetermined areas at which the seals will be made, such as in FIG. 2. Further, as mentioned hereinbefore, when making lap joints from paper-polyethylene laminas, the colloidal silica may or may not be present, as desired, between the paper and polyethylene plies of the laminas. The lap joint may be between two separate paper-polyethylene laminas; or it may be used to bond the opposite marginal edges of a single paper-polyethylene lamina in a lap seam such as in the formation of the body of a container.

The following examples are by way of description only and are not to be construed as limitations on the invention.

*Example I*

A paper web 7.5 mils thick and having a smooth, calendered surface and a moisture content of about 6% was fed from a roll past a coater from which was applied to the upper surface of the web a layer of colloidal silica of the type disclosed and claimed in U.S. Patent 2,577,485. This silica sol contained about 30% solids in water and sufficient thereof was applied to the surface to give a layer of solids after drying of about 4 mgs. per 4 in.$^2$. The aqueous colloidal silica sol was dried by heating it to a temperature of about 200° F. for 3 to 4 seconds, whereupon the water of the colloidal silica solution was evaporated. The web having the dried coating thereon was fed into the nip between a pair of pinch rollers, into which nip was also fed a semi-molten film of polyethylene immediately after its emergence from a conventional film extruder. The polyethylene film, at the time of its entrance into the nip between the rollers, was at a temperature of about 600° F. and at a thickness of 0.75 mil. This film was pressed onto the coated surface of the paper web. The pressure exerted on the hot polyethylene film and subjacent paper web caused the polyethylene to adhere tenaciously to the coated surface of the paper web. Such a construction is shown in FIG. 1.

Tests were conducted on a lamina produced in the manner of Example I to determine the amount the adhesion of the polyethylene to the paper web was improved by means of the instant invention. These tests indicated that the adhesion of the polyethylene to the paper had increased from 10 to 30 times over polyethylene-paper lamina produced in accordance with similar prior art procedures which omitted the use of the colloidal silica as an adhesion promoter.

*Example II*

This example pertains to the making of lap seams from paper-polyethylene laminas, as shown in FIG. 2. These laminas had no layer of dried silica sol between the paper and polyethylene plies as in Example I; but, with the exception of the control, did have the indicated amounts of dried silica sol on the surface of a paper ply opposite its associated polyetyhlene ply. Portions of two laminas were overlapped with the polyethylene side of one lamina in contact with the coated paper surface of the other lamina. In the control, the polyethylene side was placed in contact with an uncoated paper surface. These overlapped portions were then compressed with a force of about 300 p.s.i. between a support and a heat sealing tool maintained at a temperature of about 350° F. with the tool contacting the paper surface opposite the portion of polyethylene film forming the bond. By this means the polyethylene was heated through its associated paper ply. This procedure was repeated until a fibre tearing seal between the overlapped paper and polyethylene was produced. The times required to produce such a seal are set forth in the table below.

| SiO$_2$ coating (mgs./4 in.$^2$): | Heat seal time (secs.) |
| --- | --- |
| 0 | 10 |
| 1.0 | 0.9 |
| 4.2 | 0.8 |
| 8.4 | 1.25 |
| 12.2 | 10.00 |

Although in Example II the polyethylene was heated through the paper ply after the overlapped portions were in position, it should be understood that the polyethylene may be heated directly, such as by an open flame, just prior to placing the laminas in overlapping position. Improved heat sealing times similar to those in the table above would also result from such modified operation.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

We claim:

1. An article of manufacture comprising a lamina of a layer of paper having on a surface thereof from 1 to 12 milligrams per 4 in.$^2$ of said surface of dried silica sol, and a layer of polyethylene heat sealed to and extending outwardly from the thus coated surface.

2. The article set forth in claim 1 wherein said paper and polyethylene layers form a flat laminate having a large surface area with respect to the cross-sectional area.

3. The article set forth in claim 1 wherein said paper and polyethylene layers form a lap joint.

4. A method of improving the adhesion of a film of polyethylene to a paper surface comprising applying a coating of silica sol in an aqueous vehicle to said surface, drying said coating to remove said vehicle and to deposit from 1 to 12 milligrams per 4 in.$^2$ of said surface of dried silica sol on said surface, and heat sealing a preformed film of polyethylene onto the dry coated surface to form a lamina.

5. The method set forth in claim 4 wherein said coating contains from 15 to 40% by weight of colloidal silica.

6. The method set forth in claim 4 wherein said coating contains about 30% by weight of colloidal silica.

References Cited in the file of this patent

UNITED STATES PATENTS

| | | |
|---|---|---|
| 2,380,775 | Meyer | July 31, 1945 |
| 2,433,515 | Jahoda | Dec. 30, 1947 |
| 2,555,506 | Powers | June 5, 1951 |
| 2,561,362 | Guillot | July 24, 1951 |
| 2,597,872 | Iler | May 27, 1952 |

OTHER REFERENCES

Polyethylene Resins, Bakelite Corporation. Copyright 1944, pages 6–7 relied on, TP 978.C 3.